United States Patent
Keller et al.

(10) Patent No.: US 9,423,848 B2
(45) Date of Patent: Aug. 23, 2016

(54) EXTENSIBLE ENERGY MANAGEMENT ARCHITECTURE

(71) Applicant: ROCKWELL AUTOMATION TECHNOLOGIES, INC., Mayfield Heights, OH (US)

(72) Inventors: Michael R. Keller, Menomonee Falls, WI (US); David A. Vasko, Hartland, WI (US); Philip J. Kaufman, Milwaukee, WI (US); David D. Brandt, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 647 days.

(21) Appl. No.: 13/839,270

(22) Filed: Mar. 15, 2013

(65) Prior Publication Data

US 2014/0277806 A1 Sep. 18, 2014

(51) Int. Cl.
*G06F 1/32* (2006.01)
*G06F 1/26* (2006.01)
(Continued)

(52) U.S. Cl.
CPC .............. *G06F 1/3203* (2013.01); *G05B 15/02* (2013.01); *G06F 1/26* (2013.01); *G06F 11/30* (2013.01); *G05B 2219/32021* (2013.01); *Y02B 70/3216* (2013.01); *Y02P 70/161* (2015.11); (Continued)

(58) Field of Classification Search
CPC ......... Y04S 50/10; Y04S 10/30; Y04S 10/54; Y04S 20/222; Y04S 20/224; Y04S 20/221; H02J 3/14; F24F 11/0086; F24F 2011/0091; G05B 15/02; H04Q 9/00; H04Q 2209/60; Y02B 70/3225; Y02B 70/3216; G05F 11/30; G06F 1/3203; G06F 11/30

USPC ......................................................... 700/295
See application file for complete search history.

(56) References Cited

U.S. PATENT DOCUMENTS 4,300,125 A 11/1981 Loshing et al.
4,341,345 A 7/1982 Hammer et al.
4,383,298 A 5/1983 Huff et al.
(Continued)

FOREIGN PATENT DOCUMENTS

CN 101369740 A 2/2009
CN 101751031 A 6/2010
(Continued)

OTHER PUBLICATIONS

Abb, "Energy Management and Optimization for the Process Industries—Advanced IT Tools for Planning, Monitoring, Controlling, and Reporting Energy System Operations", Aug. 11, 2006 Brochure, published online at [http://library.abb.com/global/scot/scot296.nsf/veritydisplay/bd2a898a24267c46c12571c70070a851/$File/3BFI402000R3001_en_Advanced_IT_Tools_for_Energy_Management.pdf], retrieved Apr. 13, 2009, 6 pages.
(Continued)

*Primary Examiner* — Crystal J Barnes-Bullock
(74) *Attorney, Agent, or Firm* — Fletcher Yoder, P.C.

(57) ABSTRACT

An energy management system may include a plurality of industrial automation devices and a first energy agent embedded within an industrial automation device of the plurality of industrial automation devices. The first energy agent may monitor one or more energy properties that correspond to the industrial automation device. Also, the first energy agent may adjust one or more operations of the industrial automation device based at least in part on the energy properties and an energy objective.

25 Claims, 3 Drawing Sheets

(51) Int. Cl.
*G06F 11/30* (2006.01)
*G05B 15/02* (2006.01)

(52) U.S. Cl.
CPC .............. *Y02P 90/205* (2015.11); *Y04S 10/30* (2013.01); *Y04S 10/54* (2013.01); *Y04S 20/221* (2013.01)

(56) References Cited

U.S. PATENT DOCUMENTS

| | | | |
|---|---|---|---|
| 4,827,395 A | 5/1989 | Anders et al. | |
| 5,202,996 A | 4/1993 | Sugino et al. | |
| 5,822,207 A | 10/1998 | Hazama et al. | |
| 5,924,486 A | 7/1999 | Ehlers et al. | |
| 6,012,053 A | 1/2000 | Pant et al. | |
| 6,015,783 A | 1/2000 | von der Osten et al. | |
| 6,263,255 B1 | 7/2001 | Tan et al. | |
| 6,281,784 B1 | 8/2001 | Redgate et al. | |
| 6,289,252 B1 | 9/2001 | Wilson et al. | |
| 6,321,983 B1 | 11/2001 | Katayanagi et al. | |
| 6,633,823 B2 | 10/2003 | Bartone et al. | |
| 6,701,298 B1 | 3/2004 | Jutsen | |
| 6,732,055 B2 | 5/2004 | Bagepalli et al. | |
| 6,747,368 B2 | 6/2004 | Jarrett, Jr. | |
| 6,785,592 B1 | 8/2004 | Smith et al. | |
| 6,857,020 B1 | 2/2005 | Chaar et al. | |
| 6,859,755 B2 | 2/2005 | Eryurek et al. | |
| 6,965,319 B1* | 11/2005 | Crichlow | H04Q 9/00 340/870.02 |
| 6,983,210 B2* | 1/2006 | Matsubayashi | H02J 13/0062 702/182 |
| 7,043,316 B2 | 5/2006 | Farchmin et al. | |
| 7,143,300 B2* | 11/2006 | Potter | G06F 1/3209 709/224 |
| 7,274,975 B2 | 9/2007 | Miller | |
| 7,277,864 B2 | 10/2007 | Ohnemus et al. | |
| 7,409,303 B2 | 8/2008 | Yeo et al. | |
| 7,451,019 B2 | 11/2008 | Rodgers | |
| 7,477,956 B2 | 1/2009 | Huang et al. | |
| 7,531,254 B2 | 5/2009 | Hibbs et al. | |
| 7,565,351 B1 | 7/2009 | Callaghan | |
| 7,587,251 B2 | 9/2009 | Hopsecger | |
| 7,747,416 B2 | 6/2010 | Deininger et al. | |
| 7,788,189 B2 | 8/2010 | Budike, Jr. | |
| 8,068,938 B2 | 11/2011 | Fujita | |
| 8,078,330 B2* | 12/2011 | Brickfield | H02J 3/008 700/286 |
| 8,271,363 B2 | 9/2012 | Branscomb | |
| 8,744,789 B2* | 6/2014 | Hanley | G01D 4/002 700/291 |
| 9,014,996 B2* | 4/2015 | Kamel | G06Q 10/10 324/103 R |
| 9,275,354 B2* | 3/2016 | Saito | G06Q 10/04 |
| 2002/0013744 A1 | 1/2002 | Tsunenari et al. | |
| 2002/0026343 A1 | 2/2002 | Duenke | |
| 2002/0066072 A1 | 5/2002 | Crevatin | |
| 2002/0099464 A1 | 7/2002 | O'Connor et al. | |
| 2002/0099804 A1 | 7/2002 | O'Connor et al. | |
| 2002/0116239 A1 | 8/2002 | Reinsma et al. | |
| 2002/0169582 A1 | 11/2002 | Eryurek et al. | |
| 2002/0178047 A1 | 11/2002 | Or et al. | |
| 2002/0198755 A1 | 12/2002 | Birkner et al. | |
| 2003/0014500 A1 | 1/2003 | Schleiss et al. | |
| 2003/0028527 A1 | 2/2003 | Crosby et al. | |
| 2003/0061091 A1 | 3/2003 | Amaratunga et al. | |
| 2003/0088370 A1 | 5/2003 | Bagepalli et al. | |
| 2003/0110065 A1 | 6/2003 | Twigge-Molecey | |
| 2003/0110369 A1 | 6/2003 | Fish et al. | |
| 2003/0171851 A1 | 9/2003 | Brickfield et al. | |
| 2004/0088119 A1 | 5/2004 | Landgraf | |
| 2004/0107345 A1 | 6/2004 | Brandt et al. | |
| 2004/0117240 A1 | 6/2004 | Ness et al. | |
| 2004/0158506 A1 | 8/2004 | Wille | |
| 2004/0199294 A1 | 10/2004 | Fairlie et al. | |
| 2004/0204772 A1 | 10/2004 | Maturana et al. | |
| 2004/0205412 A1 | 10/2004 | Staron et al. | |
| 2004/0249697 A1 | 12/2004 | Ohnemus et al. | |
| 2004/0260489 A1 | 12/2004 | Mansingh et al. | |
| 2005/0015287 A1 | 1/2005 | Beaver | |
| 2005/0034023 A1 | 2/2005 | Maturana et al. | |
| 2005/0065971 A1 | 3/2005 | Honda | |
| 2005/0143865 A1 | 6/2005 | Gardner | |
| 2005/0144154 A1 | 6/2005 | DeMesa et al. | |
| 2005/0171910 A1 | 8/2005 | Wu et al. | |
| 2005/0198241 A1 | 9/2005 | Pavlik et al. | |
| 2005/0198333 A1 | 9/2005 | Dinges et al. | |
| 2005/0278296 A1 | 12/2005 | Bostwick | |
| 2006/0026145 A1 | 2/2006 | Beringer et al. | |
| 2006/0248002 A1 | 11/2006 | Summer et al. | |
| 2007/0038646 A1 | 2/2007 | Thota | |
| 2007/0073750 A1 | 3/2007 | Chand et al. | |
| 2007/0283030 A1 | 12/2007 | Deininger et al. | |
| 2008/0015975 A1 | 1/2008 | Ivchenko et al. | |
| 2008/0046387 A1 | 2/2008 | Gopal et al. | |
| 2008/0046407 A1 | 2/2008 | Shah et al. | |
| 2008/0059457 A1 | 3/2008 | Ohnemus et al. | |
| 2008/0079560 A1 | 4/2008 | Hall et al. | |
| 2008/0127779 A1 | 6/2008 | Morales Cerda et al. | |
| 2008/0154749 A1 | 6/2008 | D'hooghe et al. | |
| 2008/0255899 A1 | 10/2008 | McConnell et al. | |
| 2008/0270272 A1 | 10/2008 | Branscomb | |
| 2008/0272934 A1 | 11/2008 | Wang et al. | |
| 2008/0319812 A1 | 12/2008 | Sousa et al. | |
| 2009/0083843 A1 | 3/2009 | Wilkinson, Jr. et al. | |
| 2009/0099887 A1 | 4/2009 | Sklar et al. | |
| 2009/0100159 A1 | 4/2009 | Extra | |
| 2009/0132176 A1 | 5/2009 | McConnell et al. | |
| 2009/0138415 A1 | 5/2009 | Lancaster | |
| 2009/0177505 A1 | 7/2009 | Dietrich et al. | |
| 2009/0222307 A1 | 9/2009 | Beaver | |
| 2009/0281674 A1 | 11/2009 | Taft | |
| 2009/0281677 A1 | 11/2009 | Botich et al. | |
| 2009/0313164 A1 | 12/2009 | Hoglund | |
| 2009/0319315 A1 | 12/2009 | Branscomb | |
| 2010/0023360 A1 | 1/2010 | Nadhan | |
| 2010/0030601 A1 | 2/2010 | Warther et al. | |
| 2010/0042455 A1 | 2/2010 | Liu et al. | |
| 2010/0057480 A1 | 3/2010 | Arfin et al. | |
| 2010/0088136 A1 | 4/2010 | Cheng et al. | |
| 2010/0100405 A1 | 4/2010 | Lepore et al. | |
| 2010/0131343 A1 | 5/2010 | Hamilton | |
| 2010/0138003 A1 | 6/2010 | August et al. | |
| 2010/0217642 A1 | 8/2010 | Crabtree et al. | |
| 2010/0217651 A1 | 8/2010 | Crabtree et al. | |
| 2010/0218108 A1 | 8/2010 | Crabtree et al. | |
| 2010/0249975 A1 | 9/2010 | Rezayat | |
| 2010/0262445 A1 | 10/2010 | DeSorbo | |
| 2010/0274367 A1 | 10/2010 | Kaufman et al. | |
| 2010/0274377 A1 | 10/2010 | Kaufman et al. | |
| 2010/0274602 A1 | 10/2010 | Kaufman et al. | |
| 2010/0274603 A1 | 10/2010 | Walker et al. | |
| 2010/0274611 A1 | 10/2010 | Kaufman et al. | |
| 2010/0274612 A1 | 10/2010 | Walker et al. | |
| 2010/0274629 A1 | 10/2010 | Walker et al. | |
| 2010/0274810 A1 | 10/2010 | Walker et al. | |
| 2010/0275147 A1 | 10/2010 | Kaufman et al. | |
| 2010/0292856 A1 | 11/2010 | Fujita | |
| 2010/0306097 A1* | 12/2010 | Greiner | G06Q 40/04 705/37 |
| 2010/0314940 A1 | 12/2010 | Palmer et al. | |
| 2010/0318233 A1 | 12/2010 | Yunes et al. | |
| 2010/0332373 A1 | 12/2010 | Crabtree et al. | |
| 2011/0046800 A1 | 2/2011 | Imes et al. | |
| 2011/0071721 A1 | 3/2011 | Gilfillan et al. | |
| 2011/0172838 A1 | 7/2011 | Pai et al. | |
| 2011/0231320 A1* | 9/2011 | Irving | G06Q 30/00 705/80 |
| 2011/0273022 A1 | 11/2011 | Dennis et al. | |
| 2012/0017100 A1* | 1/2012 | Petit | G06F 1/3203 713/300 |
| 2012/0150707 A1* | 6/2012 | Campbell | G06Q 30/04 705/34 |
| 2012/0165998 A1* | 6/2012 | Choi | G01D 4/02 700/286 |

(56) References Cited

U.S. PATENT DOCUMENTS

| | | | | |
|---|---|---|---|---|
| 2013/0075484 A1* | 3/2013 | Rhee | ...................... | G01D 4/004 236/1 F |
| 2013/0211783 A1* | 8/2013 | Fisher | ...................... | G06F 11/30 702/182 |
| 2014/0309800 A1* | 10/2014 | Morin | ...................... | H02J 3/14 700/295 |

FOREIGN PATENT DOCUMENTS

| | | |
|---|---|---|
| CN | 102156457 A | 8/2011 |
| CN | 102591273 A | 7/2012 |
| EP | 0977137 A2 | 2/2000 |
| EP | 2343791 A2 | 10/2011 |
| WO | WO 2004/074954 A2 | 2/2004 |
| WO | WO 2008/011427 A2 | 1/2008 |

OTHER PUBLICATIONS

Abb, "Energy Management Solution for the Process Industry—Energy Management and Optimization", Apr. 6, 2007 Brochure, published online at [http://library.abb.com/global/scot/scot313.nsf/veritydisplay/5e48efb88a7e1cbac125734600737b02/$File/3BFI405000R4001_en_Energy_Management_and_Optimization_3.5.pdf], retrieved Apr. 13, 2009, 12 pages.

Dietmair, A., et al., "Energy Consumption and Optimization for Production Machines", Sustain-able Energy Technologies, 2008, ICSET 2008, IEEE International Conference on IEEE, Piscataway, NJ, USA, Nov. 24, 2008, pp. 574-579, XP031442235, ISBN:978-1-4244-1887-9.

EPO: Notice from the European Patent Office dated Oct. 1, 2007 concerning Business Methods, Official Journal of the European Patent Office, vol. 30, No. 11, Nov. 1, 2007, pp. 592-593.

European Search Report for European Patent Application No. 10160581.4-1238 dated Sep. 23, 2010, 8 pages.

European Search Report for European Patent Application No. 10160585.5-1527/2254061 dated Dec. 20, 2010, 9 pages.

European Search Report for European Patent Application No. 10160649.9-1238 dated Sep. 23, 2010, 8 pages.

European Search Report for European Patent Application No. 10160673.9-1238 dated Sep. 23, 2010, 9 pages.

European Search Report for European Patent Application No. 10160737.2-1238 dated Nov. 4, 2010, 9 pages.

European Search Report for European Patent Application No. 10160810 dated Aug. 6, 2010, 2 pages.

European Search Report for European Patent Application No. 10160811.5 dated Sep. 20, 2010, 9 pages.

Kennedy, Pat, et al., "In Pursuit of the Perfect Plant—A Business and Technical Guide", Apr. 2008, Chapter 9—Energy Management, pp. 251-283; published by Evolved Technologist Press, New York, New York, USA.

Kiritsis D., et al., "Research Issues on Product Lifecycle Management and Information Tracking Using Smart Embedded Systems", Advanced Engineering Informatics, Elsevier Lnkd—DOI : 10.1016/J. AEI.2004.09.005, vol. 17, No. 3-4, Jul. 1, 2003, pp. 189-202, XP004595481 ISSN: 1474-0346.

Kouloura, et al., "A Systems Approach to Corporate Sustainability in Energy Management of Industrial Units", IEEE Systems Journal, vol. 2, No. 4, Dec. 2008, pp. 442-452.

Seref Erkayhan Ed—Ding Zhen-Hua, et al., "The Use of RFID Enables a Holistic Information Management Within Product Lifecycle Management (PLM)". RFID EURASIA, 2007 1$^{st}$ Annual, IEEE, PI Sep. 1, 2007, pp. 1-4 XP031153342. ISBN: 978-975-01-5660-1.

Yang, et al., "Eco-Design for Product Lifecycle Sustainability", IEEE International Conference on Industrial Informatics, 2006, pp. 548-553.

Y-S Ma, et al., "Product Lifecycle Analysis and Optimization in an Eco-Value Based, Sustainable and Unified Approach", Industrial Informatics, 2006 IEEE International Conference on, IEEE, PI, Aug. 1, 2006, pp. 537-541, XP031003409, ISBN:978-0-7803-9700-2.

U.S. Appl. No. 13/275,983, filed Oct. 18, 2011, David D. Brandt.

European Search Report for Application 14160324.1-1807 mailed on Jun. 18, 2014.

CN Office Action for CN Application No. 201410098219.X Mailed May 25, 2016; 14 Pages.

* cited by examiner

EXTENSIBLE ENERGY MANAGEMENT ARCHITECTURE

BACKGROUND

The present disclosure relates generally to the field of industrial automation control systems. More particularly, embodiments of the present disclosure relate to an extensible energy management architecture that may provide energy management operations for various components within an industrial automation system.

Industrial automation systems are generally managed and operated using automation control and monitoring systems. A wide range of applications exist for automation control and monitoring systems, particularly in industrial automation settings. Such applications may include the powering of a wide range of actuators, such as valves, electric motors, and so forth, and the collection of data via sensors. Typical automation control and monitoring systems may include one or more components, such as programming terminals, automation controllers, input/output (I/O) modules, and/or human-machine interface (HMI) terminals.

Generally, the energy produced and used by various devices in an industrial automation system is managed by an energy management system. Conventional energy management systems for industrial automation systems are typically separate systems added to an existing infrastructure of the automation control and monitoring systems. As such, existing energy management systems are typically employed in parallel with the existing automation control and monitoring systems. Consequently, the energy management systems duplicate much of the infrastructure of the existing automation control and monitoring systems.

Although these conventional energy management systems may provide some energy management operations for the industrial automation system, these conventional energy management systems are incapable of providing efficient ways to expand the energy management system or architecture as more devices are added to the industrial automation system. Accordingly, improved systems and methods for managing the energy of an industrial automation system are desirable.

BRIEF DESCRIPTION

In one embodiment, the present disclosure is related to an energy management system may include a plurality of industrial automation devices and a first energy agent embedded within an industrial automation device of the plurality of industrial automation devices. The first energy agent may monitor one or more energy properties that correspond to the industrial automation device. Also, the first energy agent may adjust one or more operations of the industrial automation device based at least in part on the energy properties and an energy objective.

In another embodiment, the present disclosure is related to an energy agent may include a data agent configured to acquire raw energy data that corresponds to at least one device in an industrial automation system. The energy agent may also include a monitor agent configured to analyze energy data that corresponds to the at least one device, a communication agent configured to communicate with one or more energy agents embedded within one or more devices in the industrial automation system, a control agent configured to control one or more operations of the at least one device based at least in part on one or more energy objectives that correspond to the at least one device or the industrial automation system, and a visualization agent configured to generate one or more visualizations that correspond to the raw energy data or the energy data analyzed by the monitor agent.

In yet another embodiment, the present disclosure is related to a method that may include receiving, using a processor, an indication that a first energy agent has been coupled to a communication network coupled to a plurality of devices in an industrial automation control system. The first energy agent may be embedded in a first device in the industrial automation system and may be configured to adjust one or more operations of the first device based at least in part on an energy objective. The method may also include exchanging a plurality of energy profiles that corresponds to the plurality of devices with the first energy agent and adjusting one or more operations of the plurality of devices based at least in part on the energy objective, the exchanged plurality of energy profiles, and an energy profile of the first device.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure is generally directed towards providing an extensible energy management system for an industrial automation system. In certain embodiments, the extensible energy management system may use energy agents to make up the extensible management system. Energy agents may be applications embedded within microprocessors or controllers of devices in the industrial automation system, as opposed to being coupled to microprocessors or controllers as separate devices. In one embodiment, the energy agent may have various capabilities and attributes that may enable it to monitor and control the energy associated with its respective device. Moreover, the energy agent may be capable of knowing its position relative to the extensible energy management system such that it is self-aware of its surrounding energy environment. For instance, the energy agent may provide monitoring operations, data recording operations, control operations, visualization operations, and the like for its respective device in view of the energy characteristics of its respective device. In any case, the extensible energy management system may define standards for the definition and identification of each energy agent, as well as standards for the interactions between each energy agent. That is, the extensible energy management system may provide a framework for the energy agents to communicate and work with each other to implement energy related goals. As a result, when new devices are added to the extensible energy management system, the existing energy agents within the extensible energy management system may automatically identify the new device, exchange information with the new device, and modify its operations based on the addition of the new device.

Figure 1:
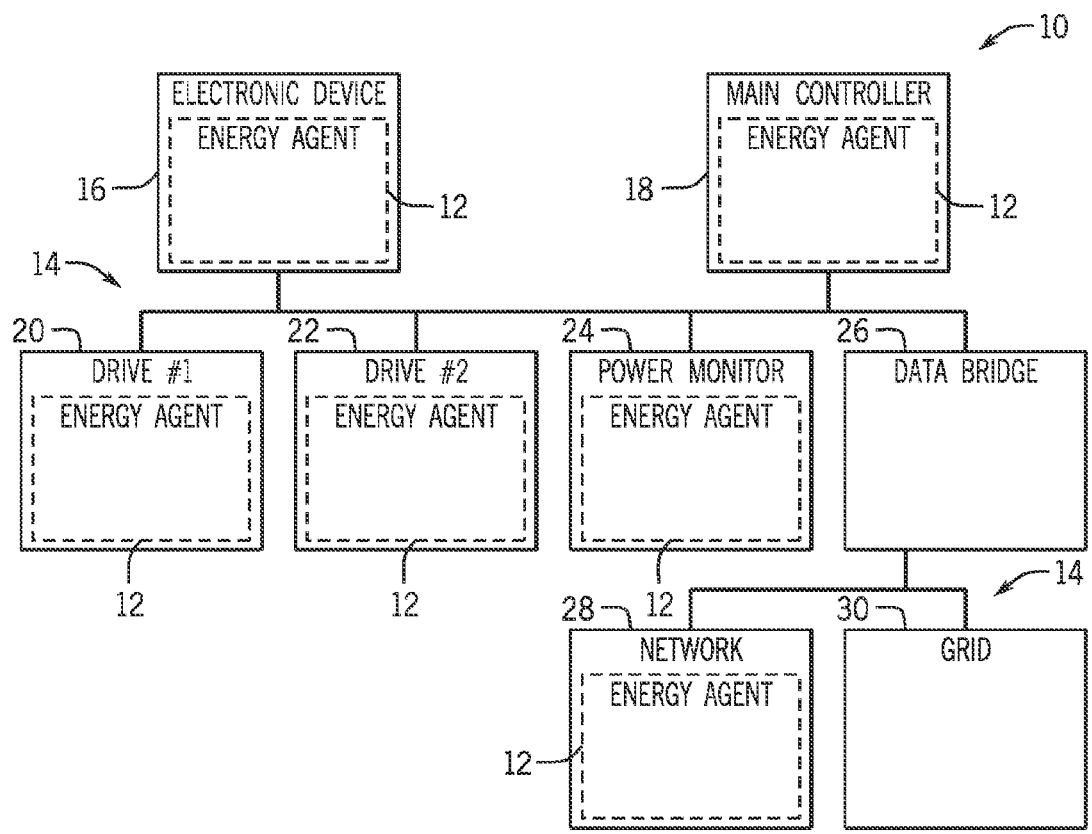
FIG. 1 is a block diagram of an energy management system for an industrial automation system, in accordance with an embodiment.

Referring now to the figures, FIG. 1 depicts a block diagram of an energy management system 10 that may be used to employ various techniques described herein. The energy management system 10 may provide an architecture or infrastructure in which the energy associated with various devices within an industrial automation system may be tracked, analyzed, managed, and so forth. The architecture may be built on an open standard and may include extensions to create a hierarchy of the devices within the architecture such that the energy of the entire hierarchy may be considered as a single entity. As such, in one embodiment, various energy properties associated with the devices within the industrial automation system may be tracked, analyzed, and managed using energy agents 12 which may be embedded within processors of the industrial automation system devices. In certain embodiments, each energy agent 12 may be embedded within an input/output controller, a supervising controller, a machine controller, a line controller, and the like.

The energy agents 12 may include software protocols or modules that may be self-energy aware such that they may understand the capabilities of its corresponding device, that is, each energy agent 12 may have the ability to increase power, reduce power, provide power back to a grid (e.g., regenerative drive), or be more energy efficient, by controlling the operation of its respective device. In one embodiment, each energy agent 12 may receive and interpret factory specifications related to its respective device to understand the capabilities of the respective device. However, in addition to using the factory specification of the respective device, the energy agents 12 may use various sensors and other information received from other energy agents 12 to determine whether the respective devices are capable of meeting all of the factory specifications. For instance, a 200-watt power supply may lose some of its ability to provide 200 watts of power over time and may instead be able to provide just 190 watts of power. The energy agent 12 associated with this power supply may realize this limitation of its respective device and communicate this limitation to various other energy agents 12 such that its device is accurately represented and accounted for in any data processes that may rely on the capabilities of the respective device.

Keeping this in mind, the energy agents 12 may be used to autonomously implement goal driven actions or plans with their devices. That is, each energy agent 12 may act independently to implement various actions for a respective device in which the energy agent 12 may be embedded. As such, the energy agent 12 may monitor the energy properties of its respective device, communicate with other energy agents 12 to determine the energy properties of their respective devices, and control the operations of its respective device based on the energy properties of its respective device and the energy properties of other surrounding devices. For instance, each energy agent 12 may track energy properties that correspond to the device in which it is embedded, communicate these energy properties with other energy agents 12, predict energy usage for each device in the industrial automation system based on these energy properties, modify the operations of each device to meet energy objectives, and the like. By way of example, energy properties may include power consumption, efficiency, temperature, and the like.

In one embodiment, once an energy agent 12 is embedded within its device, the energy agent 12 may retrieve energy data from the memory of the device. To retrieve the energy data from the device, the energy agent 12 may perform a comprehensive search of the device's memory components (e.g., hardware) and identify data that resemble energy data. That is, the energy agent 12 may search the device for historical data having energy related information embedded therein. The energy agent 12 may also scan the hardware components of the device, such as hardware components, to determine the type of sensors that may be coupled to the device and the type of data that the hardware components are capable of receiving. In any case, once the energy agent 12 identifies and interprets the energy data associated with its device, the energy agent 12 may perform various operations using the energy data. Additional details with regard to the energy agents 12 will be provided below with reference to FIG. 2.

Referring back to FIG. 1, the energy agents 12 may use the infrastructure provided by the energy management system 10 to exchange information and communicate with each other such that energy related to each industrial automation system device may be processed and analyzed. For instance, the energy agents 12 within devices such as industrial automation drives, motor starters, contactors, programmable controllers, switchgear, energy meters, robots, robot controllers, human machine interfaces (HMIs), and the like, may communicate with each other via a communication network 14.

By way of example, FIG. 1 depicts an energy management system 10 that includes an electronic device 16, a main controller 18, motor drives 20 and 22, a power monitor 24, a data bridge 26, a network 28, and an electrical grid 30, which may communicate with each other via the communication network 14. In one embodiment, the electronic device 16 may include any type of device that is used to interact with various devices on the energy management system 10. For instance, the electronic device 16 may include a personal computer (PC), tablet computer, mobile device, and the like.

The main controller 18 may control the operation of each device in the industrial automation system. As such, the main controller 18 may include a communication component, a processor, a memory, storage, and the like. The communication component may be a wireless or wired communication component that may facilitate communication between the main controller 18 and each device in the industrial automation system. The processor may be any type of computer processor or microprocessor capable of executing computer-executable code. The memory and the storage may be any suitable articles of manufacture that can serve as media to store processor-executable code. These articles of manufacture may represent computer-readable media (i.e., any suitable form of memory or storage) that may store the processor-executable code used by the processor to perform the presently disclosed techniques.

In one embodiment, the main controller 18 may be positioned at the top of a hierarchy of the energy management system 10. As such, the energy agent 12 embedded within the main controller 18 may propagate or send energy objectives and commands to each energy agent 12 that may correspond to a device downstream or in a lower level in the hierarchy of the energy management system 10. Moreover, since the main controller 18 may be positioned at the top of a hierarchy of the energy management system 10, the energy agent 12 embedded within the main controller 18 may aggregate the energy data of each energy agent 12 that may correspond to a device downstream or in a lower level in the hierarchy of the energy management system 10.

The motor drives 20 and 22 may be coupled to loads such as motors and may provide controllable power to the loads. The power monitor 24 may be a device coupled on the same power branch as the motor drives 20 and 22 and may be configured to provide information related to the power attributes or measurements that correspond to an electrical point within the industrial automation system. The data bridge 26 may be an interface that enables data to be exchanged between the network 28, the grid 30, or any other type of device. The network 28 may include a network of computing devices such as the Internet or a cloud-based system.

In certain embodiments, the network 28 may provide energy objectives or goals for the energy management system 10. The grid 30 may include an electrical grid that may be coupled to the industrial automation system. In certain embodiments, the energy agents 12 may interact with the grid 30 to determine its energy output, capabilities, and the like. Moreover, the energy agents 12 may send commands to its respective device to output energy onto the grid.

Keeping the foregoing in mind, in certain embodiments, the electronic device 16, the main controller 18, the motor drives 20 and 22, the power monitor 24, the data bridge 26, and the network 28 may each include a respective energy agent 12 embedded therein. That is, the energy agent 12 may be embedded within a microprocessor or controller that may communicate to other energy agents 12 via the communication network 14. However, it should be noted that in some embodiments, energy agents 12 may not be embedded in each of the devices illustrated in FIG. 1. Instead, energy agents 12 may be embedded in any combination of devices illustrated in FIG. 1.

As mentioned above, each device in the energy management system 10 may use the communication network 14 to exchange information and communicate with each other. The communication network 14 may include any type of wired or wireless communication network such as a Local Area Network (LAN), Wide Area Network (WAN), or the Internet. In one embodiment, the energy management system 10 may be implemented on an existing control system infrastructure to avoid building an additional or duplicate infrastructure for the energy management system 10. That is, the energy management system 10 may perform its operations using the communication network 14, which may be the same communication network as provided for the control system. As a result, the energy management system 10 may become more extensible since adding a device with an energy agent 12 embedded therein to the existing communication network may allow the newly added energy agent 12 to quickly communicate and interact with all of the devices connected to the preexisting communication network.

Moreover, the energy agents 12 in the energy management system 10 may provide an energy information backplane for the industrial automation system such that the new devices can virtually "plug" into the energy information backplane. That is, the energy agents 12 embedded within the new devices may provide other energy agents 12 with information such as actual energy used, device specifications, actual and predicted energy costs, and the like.

In this manner, the energy agents 12 may provide infrastructure, agent protocol, and modeling tools that may be directly applicable to dynamically managing the energy of the corresponding industrial automation system. For instance, since the energy agents 12 may be self-aware of their energy utilization, the energy agents 12 may invoke various protocols to reduce energy usage or better manage the energy usage of each agent's respective devices. As such, the energy agents 12 may have opportunities to negotiate with other energy agents and dynamically reconfigure the operations of the energy agents 12 to optimize energy utilization of the industrial automation system while satisfying other opportunity constraints and demands for safety and reliability.

Figure 2:
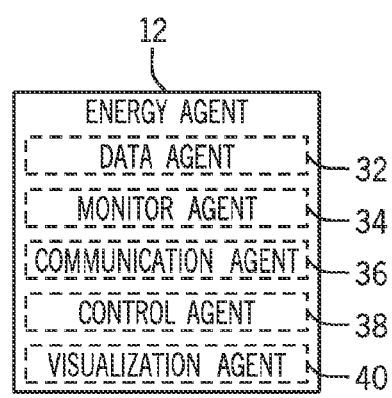
FIG. 2 is a block diagram of an energy agent for use within the energy management system of FIG. 1, in accordance with an embodiment.

FIG. 2 illustrates more details with regard to the energy agents 12. For instance, the energy agent 12 may include various protocols, software modules, or sub-agents that may be used to monitor, control, and present energy or power data related to various devices within the industrial automation system.

In any case, the sub-agents may include a data agent 32, a monitor agent 34, a communication agent 36, a control agent 38, a visualization agent 40, and the like to perform various kinds of operations. It should be noted that, in certain embodiments, the energy agent 12 may include any subset of these listed sub-agents. For example, in certain embodiments, the energy agent 12 may include at least one of the listed sub-agents. However, it should be understood that the energy agent 12 may also include any combination of the sub-agents described, and is not limited to including at least two of the provided sub-agents. For example, any three or four of these sub-agents may be used in any given energy agent 12.

In certain embodiments, the data agent 32 may retrieve raw energy data associated with the device. Raw energy data may include energy data stored in memory, acquired from sensors, and the like. In this case, the data agent 32 may retrieve raw energy data but may not interpret, process, or perform any action based on the retrieved raw energy data. Instead, the data agent 32 may enable a user or the other agents to receive or interpret the raw energy data related to the device in which the data agent 32 is embedded. In certain embodiments, the energy agent 12 may include multiple data agents 32 such that each data agent 32 may retrieve different raw energy data associated with the device.

The monitor agent 34, on the other hand, may interrogate, interpret, or derive some conclusion based on the retrieved data. That is, the monitor agent 34 may monitor or analyze the energy data of its respective device and derive some conclusion on the energy data. For instance, the monitor agent 34 may analyze the amount of energy being consumed by its respective device and may send an alarm signal to the main controller 18 if the amount of energy exceeds some limit. Moreover, in this case, the monitor agent 34 may conclude that its respective device is energy inefficient and may designate the device as such to other energy agents 12 within the communication network 14. In addition to monitoring the energy data associated with its own device, the monitor agent 34 may monitor or analyze the energy data associated with other devices having energy agents 12 embedded therein. That is, the monitor agent 34 may monitor data acquired by other devices within the industrial automation system that may be accessible via the communication network 14.

In one embodiment, the monitor agent 34 may also generate or virtualize energy data for other devices in the industrial automation system that may not have energy agents 12 disposed thereon. For instance, if the drive 22 did not include an energy agent 12, the monitor agent 34 embedded within another device in the energy management system 10 may generate a virtual model simulation of the energy data for the drive 22. As such, the monitor agent 34 may receive energy data from neighboring devices such as the drive 20 and the power monitor 24 and calculate or predict energy data for the drive 22 based on the received energy data, the power topology or structure of the industrial automation system, and the like.

Keeping the foregoing in mind, the monitor agent 34, or any other agent within the energy agent 12, may communicate to any device coupled to the communication network 14 using the communication agent 36. The communication agent 36 may enable the energy agent 12 to integrate into the communication network 14 once the energy agent 12 is connected to the communication network 14. Once connected, the communication agent 36 may include protocol transforms that may allow the communication agent 36 to interact with other energy agents 12, their respective devices, and the like.

Generally, the communication agent 36 may automatically integrate the energy agent 12 into the communication network 14 as soon as network conductivity has been established. As such, the communication agent 36 may exchange profiles with other energy agents 12 connected to the communication network 14 such that energy data for the newly connected energy agent 12 may be registered and available for processing by the other energy agents 12. The profile of each device or energy agent 12 may be defined based on the capabilities of the device. Based on these capabilities, the energy agents 12 may determine how they may interact with other energy agents 12 in the energy management system 10.

Additionally, by using the communication agents 36, the energy agents 12 coupled to the communication network 14 may freely communicate with each other and the network 28. In one embodiment, the communication agent 36 may freely interrogate a cloud-based system that may be part of the network 28. The communication agent 36 may also be used to interact with the main controller 18 to determine appropriate energy use profiles or objectives for each type of device that may be part of the industrial automation system. Additionally, the main controller 18 or the cloud-based system (e.g., of the network 28) may provide options for alternative operations of the devices to reduce energy, provide access to energy-driven condition assessment databases and algorithms, and provide access to databases providing energy use profiles of other similar equipment in similar environments. Moreover, the network 28 may be used to provide operating objectives, quality objectives, reliability objectives, energy usage objectives, and the like, for each device in the industrial automation system or for the industrial automation system as a whole.

After identifying all relevant energy data and establishing communication with other energy agents 12 on the communication network 14, the control agent 38 may alter or control the performance of the device on which the corresponding energy agent 12 is embedded. That is, the control agent 38 may alter the operations of the device to become more energy efficient, to achieve a collaborative energy objective with other energy agents 12, to achieve a minimum or optimum energy use pattern, and so forth. Further, the control agent 38 may dynamically alter the operations of its device based on the changing energy costs, changing process conditions, changing machine operation context (e.g., start-up process, high-speed operation, low priority energy operation), and the like.

In certain embodiments, the control agent 38 may employ alternative control strategies (e.g., device operations) and/or recommend alternate topologies that can achieve target production objectives in an energy-efficient manner. For example, the alternative control strategies may include proportional-integrative-derivative and the like. Alternate control strategy may also include storing materials for later processing. This could be based on avoiding starting a large motor (e.g., a grinder) to avoid increased utility demand charges based on communication of the demand interval start and end time from a power monitor. Several large controlled loads may negotiate which subset of them may operate in the current demand interval to achieve the most production or to avoid a costly operation like clean-in-place for a particular pieces of machinery. Another control strategy may include reducing an operational rate. This might take more total energy for the same production, but reduce the peak demand. Yet another strategy may include increasing the rate to complete manufacturing before an impending power outage. This may be costly in terms of wear on the machine, but it may avoid a less desirous forced utility shutdown.

The control agent 38 may determine these alternative control strategies and/or alternate topologies after interpreting the energy data received from other energy agents 12. As such, the control agent 38 may automatically determine alternative control strategies and/or alternate topologies without distracting the user of the industrial automation system.

Additionally, the control agent 38 may receive commands locally or remotely from a user that may indicate an operating mode (e.g., power savings mode, high productivity mode) for its respective device. In one embodiment, the control agent 38 may change between the operating modes of the device based on information related to energy cost, energy use objectives, operating contexts (e.g., low-priority activity to minimize energy usage), and the like.

Generally, the control agents 38 or energy agents 12 in the energy management system 10 may operate within the communication network 14 as a peer-to-peer network. As such, each control agent 38 may operate its respective device and share information related to its device with other control agents 38. In certain embodiments, all of the control agents 38 may work together to achieve an energy objective by collaboratively gathering information and collaboratively determining actions to be performed by each device in the energy management system 10. After determining appropriate actions for each device together, each control agent 38 may send commands to its respective device to operate in a manner consistent with the determined actions. For instance, the control agent 38 may negotiate with other control agents 38 (i.e., energy agents 12) to collaborate and achieve various energy objectives as described in method 50 of FIG. 3.

In one embodiment, certain sub-agents may be invoked, installed, or activated by the energy agent 12 based on inputs received from an operator. For instance, the energy agent 12 may receive various inputs that indicate the nature of the device coupled to the energy agent 12, the location within a topology of the respective device, and the like. After receiving this information, the energy agent 12 may activate a set of sub-agents (e.g., data agent 32, monitor agent 34, communication agent 36, control agent 38, visualization agent 40) to perform various operations to achieve its energy objective(s). In the same manner, the energy agent 12 may invoke, install, or activate certain sub-agents based on a determination made by the energy agent 12 with regard to the topology of the energy management system 10, the location of the energy agent 12 with respect to the energy management system 10, the type of device associated with the energy agent 12, and the like. That is, the energy agent 12 may receive information regarding the energy properties related to its respective device, and determine the topology of the energy management system 10, the location of the energy agent 12 with respect to the energy management system 10, the type of device associated with the energy agent 12, and the like. The energy agent 12 may then install or activate a set of sub-agents based on these determinations.

In this manner, each energy agent 12 may be configured or programmed by an operator to have some set of sub-agents (e.g., data agent 32, monitor agent 34, communication agent 36, control agent 38, visualization agent 40) or each energy agent 12 may determine which sub-agents it should include based on various characteristics related to the location of the energy agent 12 within the energy management system 10 (i.e., with respect to various other energy agents 12, devices, etc.), a topology of the energy management system 10, type of device associated with the energy agent 12, types of devices connected to the energy agent 12, and the like. In this case, once the energy agent 12 determines its appropriate sub-agents, it may download or retrieve the sub-agents via the network 28. Alternatively, each energy agent 12 may include each different type of sub-agent and the energy agent 12 may activate the sub-agents stored therein based on its determination.

Figure 3:
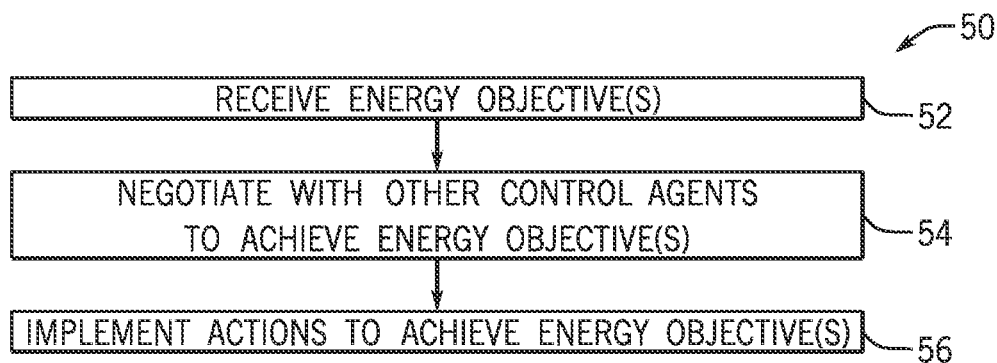
FIG. 3 is a flow chart of a method for negotiating with energy agents within the energy management system of FIG. 1, in accordance with an embodiment.

Referring now to FIG. 3, in certain embodiments, the control agent 38 may employ the method 50 to achieve one or more energy objective(s) by negotiating with other control agents 38. Although the following description of the method 50 is described as being performed by the control agent 38, it should be noted that any sub-agent within the energy agent 12 may perform the process of the method 50.

At block 52, the control agent 38 may receive one or more energy objectives that may correspond to the devices within the energy management system 10. In one embodiment, the energy objectives may include an amount of energy or power that may be used over a period of time by all of the devices in the industrial automation system, an amount of energy or power that may be used by each individual device in the industrial automation system, energy efficiency levels for the entire industrial automation system, energy efficiency levels for each device in the industrial automation system, and the like.

At block 54, the control agent 38 may negotiate with other control agents 38 to implement the energy objective(s). As such, the control agents 38 may coordinate their actions to their respective devices to achieve the energy objectives. Additional details with regard to how the control agents 38 may coordinate or negotiate their actions with each other will be described below with reference to FIG. 4. In any case, after the control agent 38 negotiates with other control agents 38 with respect to how to achieve its energy objective, at block 56, the control agent 38 may implement the negotiated actions determined at block 54 into its respective device.

Figure 4:
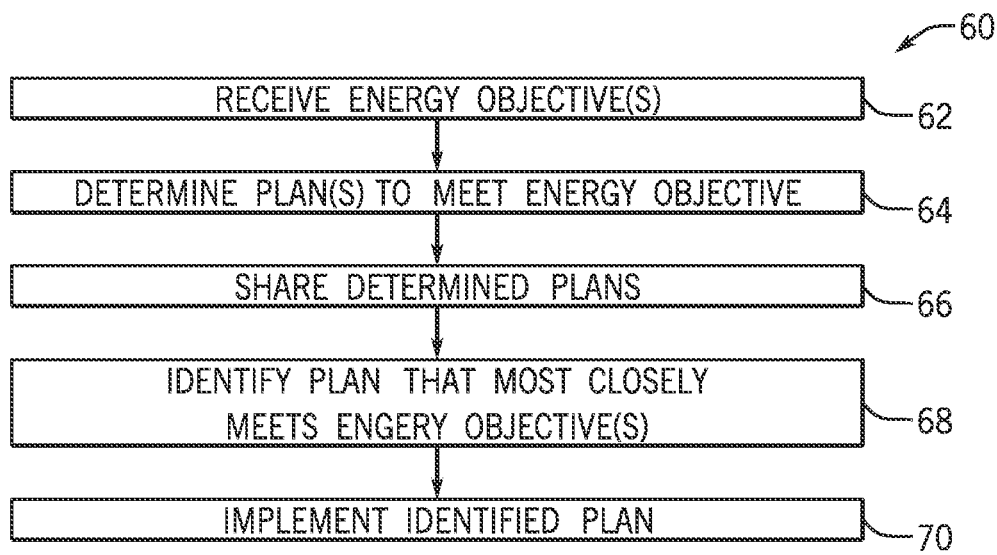
FIG. 4 is a flow chart of a method for implementing energy objective(s) using energy agents within the energy management system of FIG. 1, in accordance with an embodiment.

Keeping the foregoing in mind, FIG. 4 illustrates a flow chart of a method 60 that multiple control agents 38 may employ to achieve one or more energy objectives. As such, at block 62, each control agent 38 in the energy management system 10 may receive an energy objective from a user, the network 28, the main controller 18, or the like. By way of example, the energy objective may include energy efficiency provisions for each device in the industrial automation system, overall energy efficiency provisions for the entire industrial automation system, energy limits for the industrial automation system, and the like.

At block 64, each control agent 38 may determine an action for its respective device and any other device in the energy management system 10 that may correspond to meeting the energy objective(s). As a result, each control agent 38 may develop an individual energy plan that specifies how each device in the industrial automation system or how its respective device may operate to meet the energy objective(s).

At block 66, each control agent 38 may share its individual energy plan with the other control agents 38. As such, each control agent 38 may send its individual energy plans via the communication network 14 to the other control agents 38. In one embodiment, each control agent 38 may send its respective individual plan to one control agent 38 (e.g., the control agent 38 embedded within the master controller 18) such that the one control agent 38 may perform the remaining steps of the method 50. However, it should be noted that in other embodiments, each control agent 38 may still perform the remaining steps of the method 50.

At block 68, each control agent 38 may identify which respective plan most closely meets the energy objective(s) received at block 52. In one embodiment, different portions of the energy objective(s) may be weighted or prioritized differently. As such, each control agent 38 may identify which respective plan most closely meets the energy objective(s) received at block 52 based on a weighted score with respect to how closely each different portion of the energy objective(s) is achieved.

At block 70, each control agent 38 may implement the plan identified at block 68. As such, each control agent 38 may send one or more commands to its respective device to change its operation (or maintain its operation in some cases) such that the plan identified at block 68 is implemented. In one embodiment, the control agent 38 that corresponds to the plan identified at block 68 may then be designated as a master controller for each control agent 38 in the energy management system 10.

Referring back to FIG. 2, the energy agent 12 may also include the visualization agent 40, which may visualize or generate visualizations of the energy data received by the energy agent 12. In one embodiment, the visualization agent 40 may interact with the data agent 32 and/or the monitor agent 34 and generate visualizations depicting the energy data retrieved by these agents on a user interface or screen. For instance, the visualization agent 40 may receive energy data from the monitor agent 34 and determine what type of graphical representation may effectively relate the information contained in the energy data to a user.

In certain embodiments, the visualization agent 40 may display energy management messages that may be issued between energy agents 12. The visualization agent 40 may use the energy management messages to discover, query, and manage the devices described within the energy management messages. In some cases, upon identifying or discovering new devices in the industrial automation system, the visualization agent 40 may have a symbolic reference to identify the newly discovered device. The visualization agent 40 may also generate an alarm and event log that may indicate various alarm or event conditions that may occur within various devices in the industrial automation system, and may include links to the devices that correspond to the alarm or event.

Figure 5:
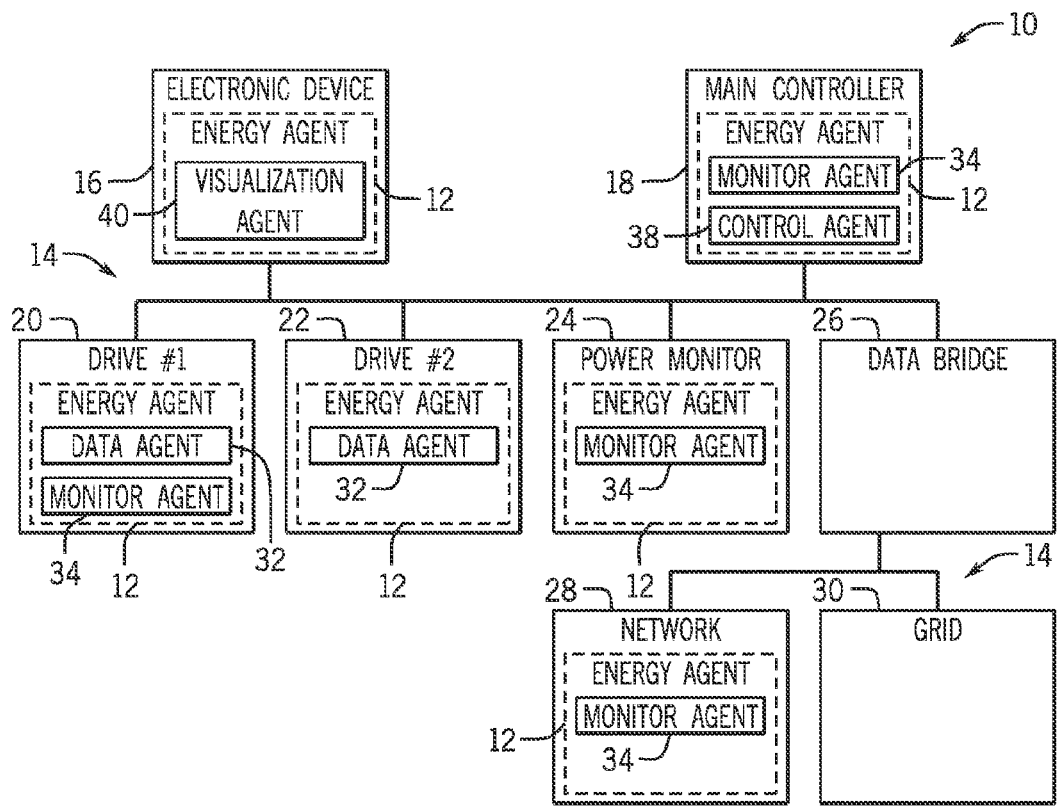
FIG. 5 is a block diagram of various agents within energy agents of the energy management system of FIG. 1, in accordance with an embodiment.

By way of example, FIG. 5 illustrates an embodiment in which different sub-agents of energy agents 12 are distributed to different devices throughout the energy management system 10. For instance, the energy agent 12 in the electronic device 16 may include just the visualization agent 40 display some graphical representation to a user of the electronic device 16. In one embodiment, the visualization agent 40 may be capable of understanding how to interact with various monitor agents 34 that may be coupled to the visualization agent 40 via the communication network 14. As such, once an instance of the visualization agent 40 is instantiated on the electronic device 16, the visualization agent 40 may interrogate the energy management system 10 and locate each monitor agent 34 within the architecture of the energy management system 10. Based on the capabilities of the visualization agent 40, the visualization agent 40 may receive energy data acquired by each monitor agent 34 and display some graphical representation of the energy data. In certain embodiments, the visualization agent 40 of the electronic device 16 may display the energy data in a manner that may be most useful to the user of the electronic device 16. For instance, the visualization agent 40 of the electronic device 16 may display graphical representations of the energy being used by the drive 20 given its proximity to the drive.

Like the visualization agent 40 of the electronic device 16, the control agent 38 of the main controller 18 may interact with other energy agents 12 or sub-agents within energy agents 12 in the energy management system 10. As mentioned above, the control agent 38 may alter the performance of the device on which the corresponding energy agent 12 is embedded. Keeping this in mind, the control agent 38 may alter the operation of drive 20 and drive 22 based on information received from various energy agents 12 in the energy management system 10. For example, the control agent 38 of the main controller 18 (FIG. 5) may receive energy data information from each data agent 32 and monitor agent 34 in the energy management system 10. Using the acquired information, the control agent 38 may alter the operation of various devices in the energy management system 10 to achieve various energy objectives or goals. For instance, if the control agent 38 determines that the drive 20 is conducting an unequal amount of power as compared to the drive 22, the control agent 38 may send commands to the drive 20 and to the drive 22 to alter their operations such that each drive conducts a substantially equal amount of power or such that the energy objectives for the energy management system 10 are achieved.

In one embodiment, the monitor agent 34 in the network 28 may monitor data acquired by other monitor agents 34 in the energy management system 10. As such, the data acquired by the monitor agent 34 in the network 28 (e.g., cloud) may be used to determine an appropriate action for the overall industrial automation system. For instance, the monitor agent 34 in the network 28 may determine an amount of overall power being used by each device in the energy management system 10. The monitor agent 34 may also interact with the grid 30 to determine an amount of power being drawn from the grid 30 and the maximum amount of power available from the grid 30. Using the information provided by the monitor agent 34 in the network 28, an operator of the energy management system 10 may make decisions based on all of the available information. For instance, the user may compare the overall amount of power being consumed by the devices in the energy management system 10 to the amount of power being drawn from the grid 30 and the maximum amount of power available from the grid 30 to determine whether the devices in the energy management system 10 can operate at faster speeds, higher efficiencies, and the like. The user may then adjust the operation of various devices in the energy management system 10 based on an analysis of the data available from the monitor agent 34.

In any case, by providing the ability to monitor, track, and analyze energy data within an industrial automation system in real time or near real time, the user of the industrial automation system may be able to provide a more efficient means in which to operate each device in the industrial automation system. For example, in conventional industrial automation systems, since energy savings are not typically a primary concern for users of the industrial automation system, the industrial automation system is generally operated without regard to energy constraints or energy efficiency. However, by providing the energy data associated with various devices in the industrial automation system at near instantaneous time (e.g., updated every second, every few seconds, or at a similar frequency), the users may be more likely to read and interpret the energy data. Moreover, the users may make energy conscious decisions based on the energy data. For example, the users of the industrial automation system may analyze the energy usage of each device in the industrial automation system to determine critical areas for optimization. The user may then add additional metering, optimization algorithms, energy management or optimization devices, and the like, in order to achieve various energy savings. As a result, the user of the industrial automation system may focus on achieving an energy efficient production of high quality products and processes.

Moreover, since new energy agents 12 may be integrated onto existing control networks, energy information may be seamlessly integrated in an extensible architecture (i.e., energy management system 10). That is, by enabling the energy agent 12 to integrate information from existing functional domains and devices, the energy management system 10 may enable new devices to be automatically integrated into the industrial automation system in a manner to optimize energy use of some period of time or during a production run. Further, the extensible nature of the energy management system 10 may also enable various control operations, diagnostic operations, prognostic operations, processing operations, and the like to be implemented more quickly.

Figure 6:
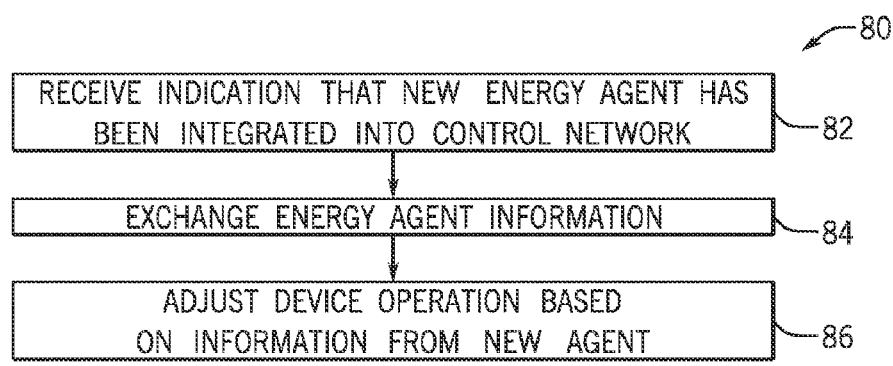
FIG. 6 is a flow chart of a method for scaling the energy management system of FIG. 1, in accordance with an embodiment.

Keeping this in mind, FIG. 6 illustrates a flow chart of a method 80 for scaling the energy management system 10. In particular, the method 80 describes how adding a new energy agent 12 onto an existing architecture of the energy management system 10 may expand the energy management system 10. In one embodiment, each energy agent 12 on an existing energy management system 10 may perform the process of the method 80 along with the new energy agent 12 added to the existing energy management system 10.

As such, at block 82, each energy agent 12 may receive an indication that a new energy agent 12 has been added or integrated into the existing energy management system 10. In certain embodiments, the new energy agent 12 may be integrated into an existing control system network of an industrial automation system. For example, when a new industrial automation device is integrated into the industrial automation system, the energy agent 12 embedded within the new industrial automation device may also become integrated into the energy management system 10 that corresponds to the industrial automation system.

At block 84, the new energy agent 12 may exchange information with other energy agents 12 that may already be present on the energy management system 10. In one embodiment, if the new energy agent 12 is the only energy agent in the energy management system 10, the new energy agent 12 may simulate energy data for the devices on the industrial automation system. That is, the new energy agent 12 may interrogate the control system and determine the types of devices and locations of the devices on the industrial automation system. The new energy agent 12 may then simulate expected energy data for the devices that do not provide energy data to the new energy agent 12 based on energy data related to its respective device, information related to the architecture or topology of the industrial automation system, information related to the energy data that corresponds to some of the devices within some proximity to the new energy agent 12, and the like.

At block 86, the new energy agent 12 or each energy agent 12 may adjust the operation of its respective device based on the new energy data received from the new energy agent 12. In one embodiment, each energy agent 12 may operate to perform some energy objective. As such, once the energy data from the new energy agent 12 is received, each energy agent 12 may better understand how the functions of its respective devices may be altered to achieve the energy objective(s). Based on its own understanding of its respective device and its effect on the energy objective, each energy agent 12 may adjust the operation of its respective device to better achieve the energy objective.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An energy management system, comprising:
   a plurality of industrial automation devices;
   a first energy agent embedded within a first industrial automation device of the plurality of industrial automation devices, wherein the first energy agent is configured to:
      monitor one or more energy properties that correspond to the first industrial automation device; and
      adjust one or more operations of the first industrial automation device based at least in part on the energy properties and an energy objective; and
   a second energy agent embedded within a second industrial automation device of the plurality of industrial automation devices, wherein the second energy agent is not capable of monitoring one or more energy properties that correspond to the second industrial automation device, and wherein the second energy agent is configured to receive the one or more energy properties that correspond to the second industrial automation device from the first energy agent.

2. The energy management system of claim 1, wherein the first energy agent is configured to:
   receive factory specifications that correspond to the industrial automation device; and
   adjust the operations of the industrial automation device based at least in part on the factory specifications.

3. The energy management system of claim 2, wherein the first energy agent is configured to:
   determine whether the industrial automation device is capable of meeting the factory specifications; and
   adjust the operations of the industrial automation device based at least in part on whether the industrial automation device is capable of meeting the factory specifications.

4. The energy management system of claim 1, comprising:
   a plurality of energy agents embedded within a subset of the plurality of industrial automation devices, wherein the first energy agent is configured to:
      exchange energy data with each of the plurality of energy agents; and
      adjust the operations of the industrial automation device based at least in part on the energy data.

5. The energy management system of claim 4, wherein the energy data is exchanged over a communication network, and wherein the communication network is the same as a control network for the plurality of industrial automation devices.

6. The energy management system of claim 5, wherein the communication network comprises an industrial communication network, wherein the industrial communication network comprises which EtherNet/IP®, DeviceNet®, ControlNet®, Profinet®, SB EtherNet/IP, or any combination thereof.

7. The energy management system of claim 4, wherein the energy data comprises an amount of energy used by the industrial automation device, a specification that corresponds to the industrial automation device, actual energy costs associated with the industrial automation device, predicted energy costs associated with the industrial automation device, or a combination thereof.

8. The energy management system of claim 1, comprising a network configured to provide the energy objective to the first energy agent.

9. The energy management system of claim 8, wherein the network is a cloud-based system.

10. The energy management system of claim 1, comprising:
    a plurality of energy agents embedded within a subset of the plurality of industrial automation devices, wherein the plurality of energy agents are downstream from the first energy agent, and wherein the first energy agent is configured to:
       aggregate energy data acquired from each of the plurality of energy agents; and
       adjust the operations of the industrial automation device based at least in part on the aggregation.

11. The energy management system of claim 1, comprising a plurality of energy agents embedded within a subset of the plurality of industrial automation devices, wherein the plurality of energy agents and the first energy agent are part of an energy management hierarchy, wherein the first energy agent is on top of the energy management hierarchy, and wherein the first energy agent is configured to send energy objectives and commands to each energy agent of the plurality of energy agents.

12. An energy agent, comprising:
    a communication agent configured to communicate with one or more energy agents embedded within one or more devices in an industrial automation system; and
    a monitor agent configured to:
       analyze energy data that corresponds to at least one device of the one or more devices; and
       simulate energy data that corresponds to a first device in the industrial automation system based at least in part on the energy data that corresponds to the at least one device and energy data that corresponds to one or more devices within one or more devices in the industrial automation system, wherein the first device is not part of the one or more devices.

13. The energy agent of claim 12, wherein the monitor agent is configured to analyze the energy data by:
    determining whether the energy data exceeds a predetermined limit; and
    sending an alarm signal to a controller that is configured to control the industrial automation system when the energy data exceeds the predetermined limit.

14. The energy agent of claim 12, wherein the monitor agent is configured to analyze energy data that corresponds to one or more devices in the industrial automation system by receiving the energy data that corresponds to the one or more devices from one or more energy agents embedded within the one or more devices via a communication network.

15. The energy agent of claim 12, wherein the communication agent is configured to automatically integrate the energy agent into a communication network once the energy agent establishes network conductivity with the communication network.

16. The energy agent of claim 15, wherein the communication agent is configured to automatically integrate the energy agent into a communication network by exchanging a profile that corresponds to the energy agent with one or more energy agents embedded within one or more devices in the industrial automation system, wherein the one or more energy agents are coupled to the communication network.

17. The energy agent of claim 12, comprising at least one of:
    a data agent configured to acquire raw energy data that corresponds to at least one device in an industrial automation system;
    a control agent configured to control one or more operations of the at least one device based at least in part on one or more energy objectives that correspond to the at least one device or the industrial automation system; and
    a visualization agent configured to generate one or more visualizations that correspond to the raw energy data or the energy data analyzed by the monitor agent.

18. The energy agent of claim 17, wherein the control agent is configured to:
    receive the one or more energy objectives;
    coordinate the one or more operations with one or more energy agents embedded within one or more devices in the industrial automation system; and
    implement the coordinated operations using the at least one device and the one or more energy agents.

19. The energy agent of claim 17, wherein the control agent is configured to:
    receive one or more energy plans from one or more energy agents embedded within the one or more devices in the industrial automation system, wherein each energy plan comprises one or more actions for each device in the industrial automation system to implement to achieve the one or more energy objectives;
    identify one of the one or more energy plans that substantially meets the one or more energy objectives; and
    implement the one of the identified one or more energy plans.

20. The energy agent of claim 17, wherein the visualization agent is configured to generate one or more visualizations for display on the at least one device, wherein the one or more visualizations depict the raw energy data, the analyzed energy data, one or more alarm conditions, or a combination thereof.

21. A method, comprising:
    receiving, using a processor, an indication that a first energy agent has been coupled to a communication network coupled to a plurality of devices in an industrial automation control system, wherein the first energy agent is embedded in a first device in the industrial automation control system and is configured to adjust one or more operations of the first device based at least in part on an energy objective;
    exchanging a plurality of energy profiles that corresponds to the plurality of devices with the first energy agent; and
    adjusting one or more operations of the plurality of devices based at least in part on the energy objective, the exchanged plurality of energy profiles, and an energy profile of the first device.

22. The method of claim 21, comprising simulating at least one energy profile for at least one of the plurality of devices, wherein the at least one of the plurality of devices does not exchange an energy profile.

23. The method of claim 22, wherein the at least one energy profile is simulated based at least in part on a subset of the plurality of energy profiles, wherein the subset corresponds to a subset of the plurality of devices within a proximity of the at least one of the plurality of devices.

24. An energy management system, comprising:
    a plurality of industrial automation devices;
    a first energy agent embedded within an industrial automation device of the plurality of industrial automation devices, wherein the first energy agent is configured to:
        monitor one or more energy properties that correspond to the industrial automation device;
        receive factory specifications that correspond to the industrial automation device;
        determine whether the industrial automation device is capable of meeting the factory specifications; and
        adjust one or more operations of the industrial automation device based at least in part on the energy properties, an energy objective, the factory specifications and whether the industrial automation device is capable of meeting the factory specifications.

25. An energy agent, comprising:
    a communication agent configured to:
        communicate with one or more energy agents embedded within one or more devices in an industrial automation system;
        automatically integrate the energy agent into a communication network once the energy agent establishes network conductivity with the communication network by exchanging a profile that corresponds to the energy agent with one or more energy agents embedded within one or more devices in the industrial automation system, wherein the one or more energy agents are coupled to the communication network; and
    at least one of:
        a data agent configured to acquire raw energy data that corresponds to at least one device of the one or more devices in the industrial automation system;
        a monitor agent configured to analyze energy data that corresponds to the at least one device;
        a control agent configured to control one or more operations of the at least one device based at least in part on one or more energy objectives that correspond to the at least one device or the industrial automation system; and
        a visualization agent configured to generate one or more visualizations that correspond to the raw energy data or the energy data analyzed by the monitor agent.

* * * * *